June 10, 1947.  H. V. JOHANNSEN  2,422,101
TERRESTRIAL GLOBE
Filed Oct. 22, 1943  2 Sheets-Sheet 1

INVENTOR.
Homer V. Johannsen
BY
Brown, Jackson, Boettcher & Dienner
Attys.

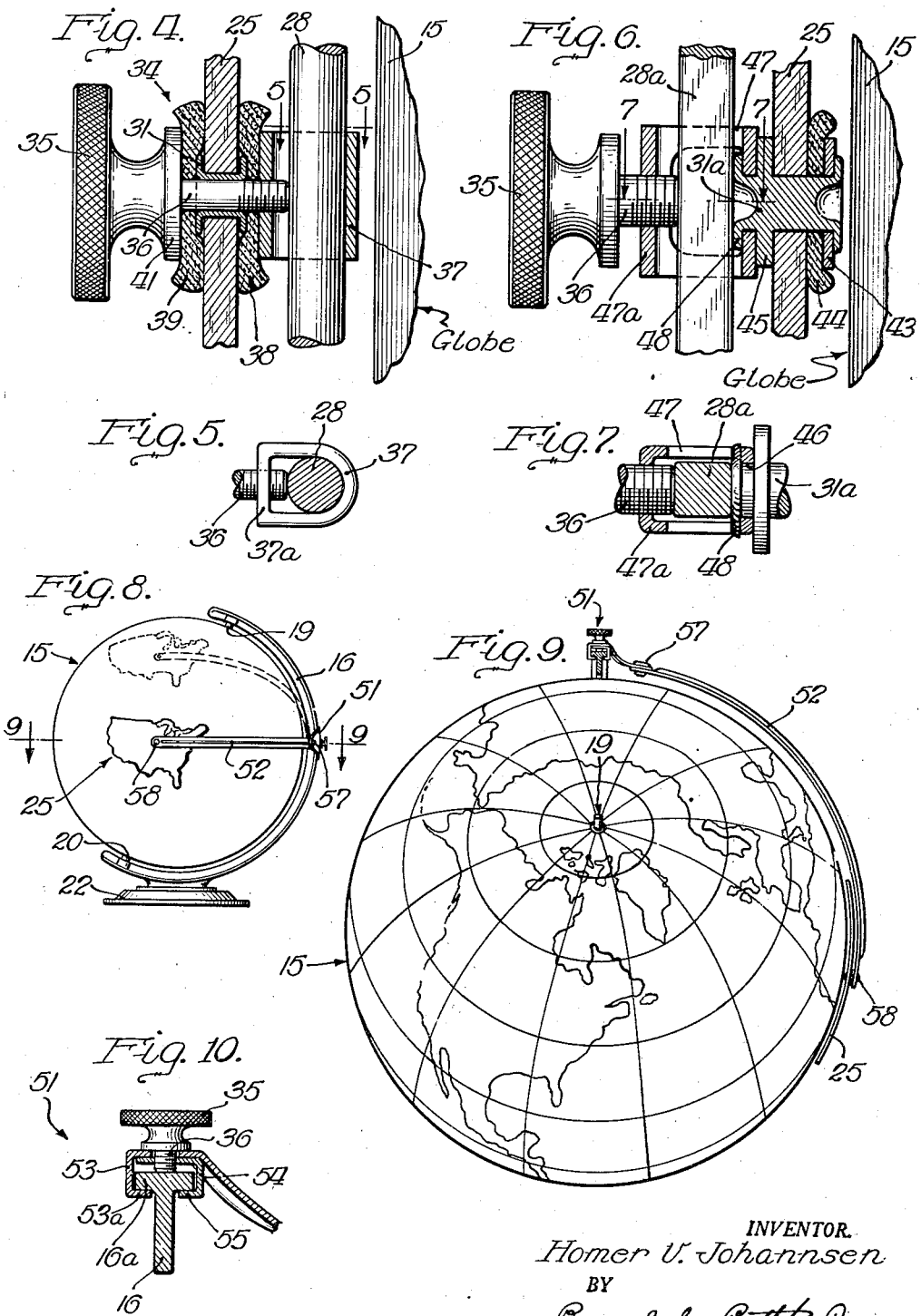

Patented June 10, 1947

2,422,101

UNITED STATES PATENT OFFICE 2,422,101

TERRESTRIAL GLOBE

Homer V. Johannsen, Chicago, Ill.

Application October 22, 1943, Serial No. 507,243

12 Claims. (Cl. 35—46)

The present invention relates to a terrestrial globe and has as its general object to provide a supplementary device thereon which will enable the area or size of one country, state or locality to be quickly and easily compared with the area or size of another country, state or locality.

In the preferred embodiment of the invention herein disclosed this supplementary device comprises a transparent replica or counterpart of the outline of the United States, which is adapted to be placed in a superposed position over any other desired country, state or locality on the surface of the globe so as to illustrate by direct comparison the relative area or size of such other country, state or locality compared to the United States. This counterpart or facsimile is preferably of transparent material, such as a clear plastic, so that unobstructed vision can always be had directly through the counterpart to observe the outlines of the country, state or region underlying the counterpart or replica in order to facilitate making the above comparison of area, size or shape. Furthermore, the different States of the United States are preferably indicated in the replica by fine outlines traced in the plastic material so that the area or size of any one State or region of the United States can be compared with the area or size of any other desired portion of the globe.

My above described invention makes the globe of greater value for general use and also for educational or classroom use. For example, it enables the teacher to show the students by direct superposition of the United States or one of its States over different foreign countries and different foreign regions the relative sizes of these foreign countries or other remote regions in terms of the size of the United States or any one of its States. This direct graphical illustration observed by the student is much easier to remember than a study of the square miles of area of one country compared to the square miles of area of another country obtained from tables or other mathematical data. For example, the student will be quite likely to remember the rather startling comparison that the entire United States could be placed bodily within the Union of Soviet Socialist Republics without touching any neighboring country. Also, that the Caspian Sea is approximately as large as the State of California; or a comparison of present interest in connection with our war with Japan that the distance from the east coast of New Guinea to Singapore is approximately the same as the distance from New York to San Francisco.

Other objects of the invention pertain to different arrangements for connecting the transparent counterpart with the globe or mounting it on the globe.

Other objects, features and advantages of the invention will appear from the following detail description of different preferred embodiments of the invention. In the accompanying drawings illustrating such embodiments:

Figure 4 is a detail sectional view, on a magnified scale, showing one embodiment of friction clamp for adjustably clamping the transparent counterpart to the swinging support wire;

Figure 5 is a detail sectional view taken approximately on the plane of the line 5—5 of Figure 4;

Figure 6 is a view similar to Figure 4 but showing a modified form of friction clamp for adjustably securing the transparent counterpart to the swinging support wire;

Figure 7 is a detail sectional view taken approximately on the plane of the line 7—7 of Figure 6;

Figure 8 is a side elevational view showing another manner of mounting the transparent counterpart on the globe;

Figure 9 is a sectional view, corresponding to a section taken approximately on the plane of the line 9—9 of Figure 8; and Figure 10 is a detail secttional view through the friction clamp of the construction illustrated in Figures 8 and 9.

Figure 1:
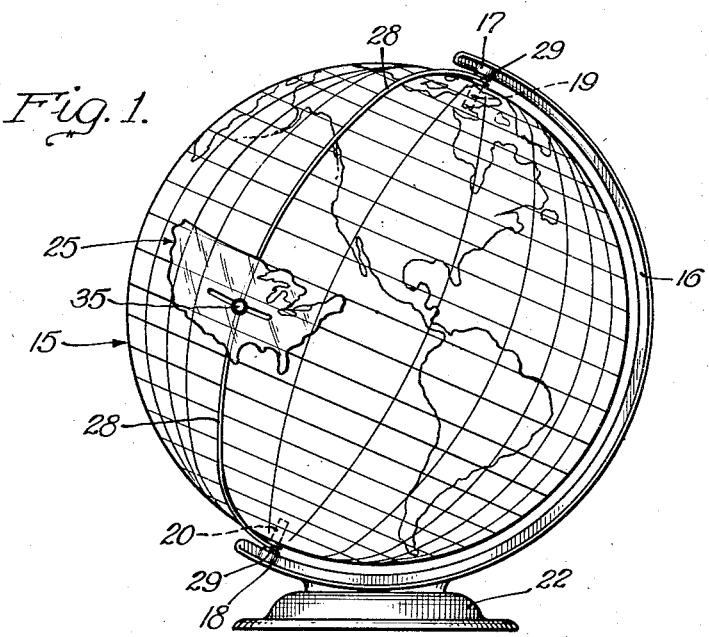
Figure 1 is a side elevational view showing a conventional form of globe embodying my invention.
Figure 2:
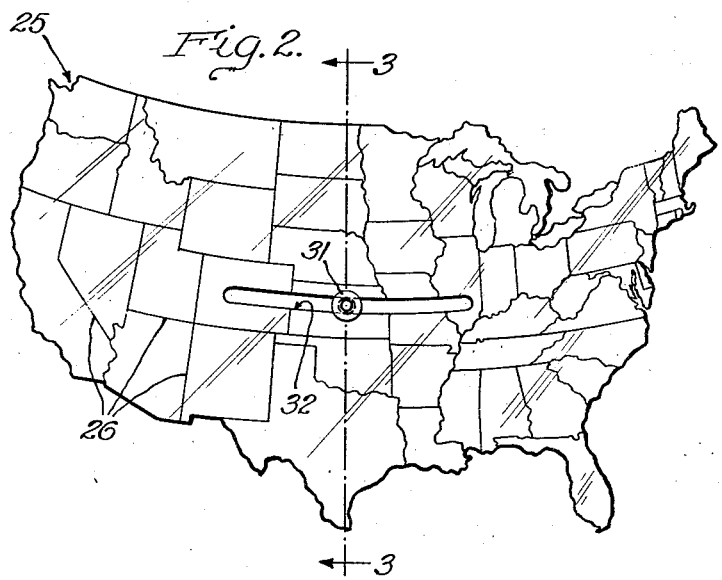
Figure 2 is a front elevational view of the transparent counterpart of the United States adapted for mounting on the globe, this counterpart illustrating all of the States in faint outlines.
Figure 3:
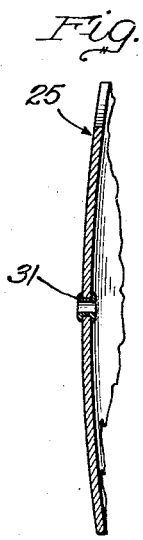
Figure 3 is a transverse sectional view taken on the plane of the line 3—3 of Figure 2, and illustrating one of the mounting arrangements in detail.

Referring first to Figures 1, 2 and 3, a conventional terrestrial globe is indicated in its entirety at 15, this globe having the usual illustrations of continents and oceans, together with the meridians and other markings of longitude and latitude, and any additional topographical features that may be desired. The globe is shown as having rotatable mounting in a semicircular supporting ring 16 carrying upper and lower inclined trunnions or bosses 17 and 18 which receive pintles 19 and 20 on which the globe is mounted. The pintles 19 and 20 define a rotative axis for the globe passing approximately through the north and south poles of the globe, and this axis is preferably inclined, as is conventional in these terrestrial globes. The semicircular supporting ring 16 may be mounted on a table base 22 or on a floor stand, as desired.

The movable counterpart representing the United States is indicated in its entirety at 25. This counterpart is composed of a suitable material which is preferably nonshattering and which preferably has a relatively high translucency or transparency. Clear "Lucite" is typical of a plastic material which may be employed, this plastic having a very high degree of transparency. This transparent counterpart 25 is constructed to the same scale as the actual illustration of the United States as it appears on the globe, i. e., the counterpart 25 may either have the exact dimensions of the United States as this area appears on the globe or it may have the projected dimensions of the United States projected outwardly along radial lines extended outwardly to the greater radius of the counterpart 25. When adapting my invention to sizes of globes which are large enough to permit the illustration of the several States of the United States, the counterpart 25 also has the several States traced therein by fine line markings 26 which define the borders of the States. On the larger sizes it may also be desirable to indicate some of the larger cities and the larger rivers on this transparent counterpart. As shown in Figure 3, the counterpart 25 is formed with a spherical curvature which closely conforms to the spherical curvature of the outer surface of the globe 15 so that the counterpart can be mounted to move in very close relationship to the surface of the globe so as to obtain more accurate comparisons of areas and sizes between the counterpart and the globe.

In the mounting arrangement illustrated in Figures 1, 2 and 3, I employ a semi-circular supporting wire or rod 28 which has its ends journaled at the trunnions 17, 18 for swinging movement substantially around the entire circumference of the globe. The rod is curved concentrically of the globe to be in close proximity thereto. The ends of the rod have bearing loops or sleeves 29 which fit over either the trunnions 17, 18 or the pintles 19, 20, preferably the latter.

The plastic counterpart 25 is mounted on this curved support 28 for sliding movement up and down along the support. To this end a metallic eyelet 31 is passed through the counterpart or facsimile and has its ends crimped over to form flanges engaging the front and rear surfaces of the counterpart. The eyelet 31 may be passed through a snug circular hole in the facsimile 25, or it may be passed through a horizontal slot 32 provided in the facsimile (Figure 2) for the purpose of enabling the latter to be shifted horizontally relatively to the supporting wire 28.

Referring to Figures 4 and 5, I have indicated at 34 a form of friction clamp which may be employed for securing the facsimile or counterpart to any desired point along the semicircular supporting wire 28. This clamp comprises a thumb screw 35 which has its threaded shank 36 passing freely through the eyelet 31 and threading through a tapped bore in a clamping sleeve 37. As shown in Figure 5, this clamping sleeve has a semi-circular inner portion which snugly embraces the curved wire 28 and has a flat outer portion 37ª into which the threaded shank 36 screws. A felt washer 38 is interposed between the flat outer wall 37ª of the clamp and the adjacent inner surface of the plastic counterpart 25. Similarly, another felt washer 39 is interposed between the outer surface of the plastic counterpart and a flange 41 formed on the clamping screw 35. When it is desired to shift the transparent counterpart 25 to a higher or lower position on the curved supporting wire 28 the thumb screw 35 is released to back the threaded shank 36 thereof away from the rod 28. Thereupon the mounting clamp and its transparent counterpart can be shifted upwardly or downwardly along the rod 28 to any other position. Retightening the thumb screw 35 rigidly clamps the clamping yoke 37 to the selected point along the wire 28, and also serves to compress the felt washers 38 and 39. This compression of these felt washers serves to fictionally retain the counterpart 25 at the desired angular position relatively to the supporting wire 28, i. e., either at the actual angle which the United States occupies on the globe or at any other desired angle which may be chosen for the purposes of comparison. The provision of the slot 32 for accommodating the horizontal shifting movement of the eyelet 31 is an optional feature which may be dispensed with if desired. The principal object of this slot is to enable the counterpart to be shifted laterally in either direction relatively to the supporting wire 28 so that if it is desired to make an accurate comparison between the area or size of one of the central States and some other portion of the globe the counterpart can be shifted so that the wire 28 will not be in such a position that it might obscure making this comparison under that particular State. After the eyelet 31 has been shifted to a chosen point in the slot 32 it will be retained in that position by the frictional clamping pressure of the felt washers 38 and 39.

In Figures 6 and 7, I have illustrated a modified clamping arrangement wherein the plastic counterpart is interposed between the supporting wire and the globe and wherein the supporting wire or rod is of polygonal cross-section so that the plastic counterpart is confined against swinging motion around the axis of said wire or rod. In this embodiment the eyelet 31ª comprises a solid shank extending through the circular hole or through the slot 32 (Figure 2) of the plastic counterpart, the inner end of this shank being peened over a washer 43 which presses a friction washer 44 against the inner surface of the counterpart 25. This washer 44, as well as the friction washers 38 and 39, are preferably composed of felt but they might also be composed of other suitable friction material. A radial flange 45 extending from the outer portion of the eyelet shank is shown as bearing directly against the outer surface of the counterpart 25; although a friction washer of felt or other material may also be interposed between this flange 45 and the counterpart. Extending outwardly beyond the flange 45 is a tubular portion of the eyelet shank which is extended through a hole 46 formed in a clamping yoke 47, this tubular portion of the shank being peened or riveted over on the inner side of the yoke as indicated at 48. As clearly shown in Figure 7, the semi-circular supporting ring or meridian is of polygonal cross-section as shown at 28ª, such as a bar of square cross-section. The clamping yoke 47 is appropriately formed so that its side walls closely embrace the square sides of the rod 28ª so as to prevent rotative swiveling of the clamp 47 around the axis of the rod. The flat inner surface of the meridian ring 28ª is also arranged to bear against the peened flat surface 48 of the eyelet shank 31ª so as further to confine the yoke and eyelet against swiveling movement around the axis of the meridian ring. The thumb screw 35 has its threaded shank 36 screwing through a threaded bore formed in the outer wall 47ª of the clamp. It will be observed that this latter arrangement of mounting clamp places the plastic counterpart in closer proximity to the surface of the globe 15 so that more accurate comparisons can be made. However, I wish it to be understood that this latter feature might also be embodied in the general construction of Figures 4 and 5; and, if desired, the swinging meridian ring 28 of circular cross-section can be employed in Figure 6 in lieu of the ring 28ᵃ of polygonal cross-section. In both embodiments the plastic counterpart 25 can be frictionally swiveled or skewed around the axis of the eyelet 31 or 31ᵃ to facilitate making comparisons, if such angular comparisons are desired.

In Figures 8, 9 and 10, I have illustrated a modified mounting arrangement for the transparent facsimile which dispenses with the swinging meridian ring 28 or 28ᵃ. In this modified construction the facsimile or counterpart is mounted on the semi-circular supporting ring 16 through the medium of a sliding friction clamp 51 and a pivoted arm 52. Referring to Figure 10, the semi-circular supporting ring 16 is shown as being of T-shape cross-section comprising a transverse outer flange 16ᵃ. The friction mounting clamp 51 embraces this transverse flange 16ᵃ. The clamp comprises a box-like stamping 53 having an inwardly extending flange 53ᵃ which hooks under the adjacent side of the transverse flange 16ᵃ. Cooperating with the stamping 53 is another stamping or clip 54 which also has an inwardly bent flange 55 which hooks in under the opposite side of the transverse flange 16ᵃ. A clamping screw 35 passes through an opening in the outer member 53 and threads through a tapped bore in the inner member 54, the inner end of the screw shank abutting against the transverse flange 16ᵃ of the semi-circular supporting ring.

As clearly shown in Figure 9, the stamping 52 has an arm portion extending laterally therefrom for supporting a pivot 57 on which the swinging arm 52 is mounted. The transparent facsimile or counterpart 25 is supported on the outer end of the swinging arm 52 through a pivot 58 which enables the counterpart to be tilted relatively to the arm. The arm 52 has a curvature concentric with the globe 15 (Figure 9) and similarly the counterpart 25 has a spherical curvature concentric with the globe so that the counterpart can be maintained in close proximity to the surface of the globe. The two pivots 57 and 58 are of the friction type for frictionally holding the arm 52 relatively to the clamp 51 and for frictionally holding the counterpart 25 at a desired angular position relatively to the arm 52. In this embodiment of my invention the mounting clamp 51 can be slid upwardly or downwardly to any desired position around the semi-circular supporting ring 16 and clamped in that position by the clamping screw 35. The pivoted arm 52 can then be swung into any desired angularity with respect to the clamp and ring 16, as indicated in dotted lines in Figure 8, and the plastic counterpart can be swiveled relatively to the arm 52 for disposing the counterpart in desired relation to the area to be compared. This area on the surface of the globe which is to be compared to the counterpart can be brought into registration with the counterpart by rotating the globe around the pintles 19, 20.

My invention also contemplates other mounting or connecting arrangements for the transparent plastic counterpart 25 than those particular arrangements herein shown. For example, the plastic counterpart might be secured directly to the friction clamp 51 of Figures 8, 9 and 10, thereby dispensing with the pivoted arm 52. In such latter arrangement the counterpart or replica could be disposed entirely to one side of the semicircular supporting ring 16, as by direct attachment to the friction pivot 57, or the counterpart might be arranged to pass between the globe and the inner perimeter of the supporting ring 16, with part of the replica lying to each side of the supporting ring. Still further, in lieu of any of the mounting arrangements above described, the transparent plastic counterpart 25 might be connected to the globe through the medium of a simple cord connected at one end to the counterpart and at the other end to the globe, this cord serving to prevent the counterpart from becoming lost while still permitting movement of the counterpart to any comparing position on the globe. This connection through the medium of a cord is subject to the disadvantage that the counterpart is no longer self-supporting in any one position of comparison or for making successive comparisons as the globe is rotated, but such type of connection may be expedient in view of the shortage of metals.

My invention is preferably built into the globe as a unitary part thereof in its original manufacture, but the counterpart 25 can also be constructed as an accessory or attachment for mounting on previously constructed globes.

It will be understood that if the globes are to be sold in Canada or Mexico the counterpart 25 would advisedly be a replica of Canada or Mexico, and this would also be true of any other foreign countries in which the globes would be used or sold.

While I have illustrated what I regard to be the preferred embodiments of my invention nevertheless it will be understood that such are merely exemplary and that numerous modifications and rearrangements may be made therein without departing from the essence of the invention.

I claim:

1. In combination, a terrestrial globe, a transparent facsimile of the outline of the United States in substantially the same scale as the illustration of the United States on said globe, said facsimile being of spherical curvature corresponding substantial to the curvature of said globe, and a curved supporting member mounting said facsimile for swinging movement around said globe in close proximity thereto for making comparisons of area between said facsimile and different portions of the globe.

2. In combination, a terrestrial globe, a transparent facsimile of the outline of the United States in substantially the same scale as the illustration of the United States appears on said globe, a curved supporting member carrying said facsimile for swinging movement around said globe in close proximity to but out of contact with said globe, and means connecting said facsimile with said supporting member whereby the facsimile can be moved to different points along said supporting member whereby comparisons of area or distance may be readily made between said facsimile and substantially any portion of the globe.

3. In combination, a supporting member, a terrestrial globe, trunnions supporting said globe for rotation in said supporting member, a bail pivotally mounted on said trunnions for swinging movement around said globe, a clamp adjustable to different positions along said bail, and a plastic transparent facsimile of the outline of the United States carried by said clamp, said facsimile being made substantially to the same scale as the illustration of the United States on the globe and being curved spherically to conform substantially to the spherical curvature of the globe, said facsimile being movable through the medium of said bail and said clamp to overlie other portions of the globe in close proximity thereto for the purpose of making comparisons of area or distance between said facsimile and other portions of the globe.

4. In combination, a terrestrial globe mounted for rotative movement about its axis, an arcuate supporting hoop journaled for rotation about the axis of said globe, a clamping yoke slidable up up and down along said supporting hoop, a thumb screw for securing said clamping yoke to any desired point along said supporting hoop, a plastic transparent counterpart of the outline of the United States curved spherically to conform substantially to the curvature of said globe, said plastic counterpart having a slot therein, an eyelet in said slot carried by said clamping yoke, and friction means for frictionally retaining said plastic counterpart in different angular and shifted positions of adjustment relatively to said clamping yoke, said plastic counterpart being movable to different positions around said globe for the purpose of making comparisons between the United States and other regions on the globe.

5. In combination, a terrestrial globe mounted for rotative movement about its axis, an arcuate supporting rod journaled for rotation about the axis of said globe, a clamping yoke slidable up and down along said supporting rod, a transparent facsimile of the United States carried by said yoke, said transparent facsimile being disposed on the outer side of said supporting rod, friction means for frictionally holding said transparent facsimile in different positions of adjustment relatively to said yoke, and a thumb screw for clamping said yoke to said supporting rod and also compressing said friction means.

6. In combination, a terrestrial globe mounted for rotative movement about its axis, an arcuate supporting bar of polygonal cross-section journaled for rotation about the axis of said globe, a clamping yoke slidable up and down along said supporting bar, a thumb screw for securing said clamping yoke to different positions along said bar, said clamping yoke being non-rotative about the polygonal cross-section of said bar, and a plastic counterpart of the outline of the United States carried by said clamping yoke and disposed between said supporting bar and the surface of the globe.

7. In combination, a terrestrial globe, a semicircular supporting ring in which globe is journaled for rotative movement, a slide movable to different positions along said supporting ring, and a transparent counterpart of one portion of said globe carried by said slide, said counterpart being curved spherically to conform substantially to the spherical curvature of the globe and being movable to different positions along said supporting ring so as to enable it to be placed in superposed positions over other portions of the surface of the globe.

8. In combination, a terrestrial globe, a semicircular supporting ring in which said globe is journaled for rotative movement, a friction clamp slidable upwardly or downwardly to different positions along said supporting ring, an arm adjustably carried by said friction clamp, and a transparent counterpart of the outline of one portion of the globe carried by said arm and movable to overlie other portions of the globe's surface.

9. In combination, a terrestrial globe, a semicircular supporting ring in which said globe is journaled for rotative movement, a friction clamp movable upwardly or downwardly along said supporting ring, an arm pivotally connected to said clamp, and a plastic replica of the United States pivotally connected to the outer end of said arm and movable to different positions over the surface of the globe.

10. In combination, a terrestrial globe, an arcuate member extending between the poles of said globe, an adjustable slide movable to different positions along said arcuate member, and a transparent counterpart of the United States pivotally mounted on said slide, said counterpart being on the same scale as the illustration of the United States on said globe and having a spherical curvature of the same radius as said globe, said counterpart being shiftable with said slide to different positions along said arcuate member and being pivotally movable relatively to said slide, so that comparisons of area or distance may be readily made between said counterpart and different portions of said globe.

11. In combination, a supportnig stand, a terrestrial globe rotatably mounted on said supporting stand for rotation about its axis, a transparent counterpart of the outline of the United States on the same scale as the illustration of the United States on said globe, said counterpart being of spherical curvature of the same radius as said globe, and means movably connecting said transparent counterpart with said stand whereby said counterpart has complete freedom of movement in all directions of longitude and latitude over the surface of the globe so as to enable comparisons of area or distance to be readily made between said counterpart and any portion of the globe.

12. In combination, a terrestrial globe, a meridian member in which said globe is journaled for rotative movement, a slide movable to different positions on said meridian member and a transparent counter-part of one portion of said globe carried by said slide, said counter-part being curved spherically to conform substantially to the spherical curvature of the globe and being movable to different positions on said meridian member so as to enable it to be placed in superposed positions over other portions of the surface of the globe.

HOMER V. JOHANNSEN.

REFERENCES CITED

The following references are of record in the file of this patent:

UNITED STATES PATENTS

| Number | Name | Date |
| --- | --- | --- |
| 253,514 | Cooke | Feb. 14, 1882 |
| 1,928,025 | McEwan | Sept. 26, 1933 |
| 1,523,188 | Flood | Jan. 13, 1925 |
| 1,450,335 | Sharp | Apr. 3, 1923 |
| 1,833,916 | Scoates | Sept. 22, 1931 |
| 774,998 | Wilson | Nov. 15, 1904 |
| 1,836,423 | Wright | Dec. 15, 1931 |
| 387,957 | Moreon | Aug. 14, 1888 |
| 381,271 | Mueller | Apr. 27, 1888 |

OTHER REFERENCES

Brinton, Graphic Methods for Presenting Facts, 1923. Pages 210 and 211. In Div. 53.